Patented Feb. 9, 1954

2,668,822

UNITED STATES PATENT OFFICE 2,668,822

ETHYLXANTHOYLTHIOXY-N,N-DIETHYL-AMINO-METHYL-PHOSPHINE OXIDE

Henry Tolkmith, Midland, Mich., assignor to The Dow Chemical Company, Midland, Mich., a corporation of Delaware No Drawing. Application April 21, 1953, Serial No. 350,235

1 Claim. (Cl. 260—455)

The present invention is directed to ethyl-xanthoylthioxy - N,N - diethylamino - methyl - phosphine oxide of the formula

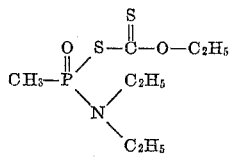

This compound is a viscous oil, somewhat soluble in many organic solvents and substantially insoluble in water. It is of value as an intermediate for the preparation of more complete phosphorus derivatives and as a toxic constituent of parasiticide compositions.

The new compound may be prepared by reacting one molecular proportion of an alkali metal ethylxanthate with one molecular proportion of N,N-diethylamidomethanephosphonic chloride of the formula

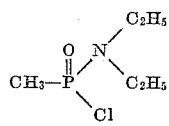

in an inert organic solvent such as benzene. Of the alkali metal xanthates found useful in the reaction, it is preferred to employ the sodium compound.

In carrying out the reaction, the sodium ethylxanthate and N,N-diethylamidomethanephosphonic chloride are dispersed in the solvent and the resulting mixture heated for a period of time at a temperature of from 40° to 80° C. As the desired product has a tendency to decompose at temperatures in excess of 80° C., temperatures substantially in excess of 80° C. for any appreciable period of time should be avoided. Upon completion of the reaction, the mixture may be filtered and the filtrate distilled under reduced pressure at gradually increasing temperatures up to a temperature of 80° C. to separate low boiling constituents and to obtain as a residue the desired ethylxanthoylthioxy - N,N - diethylamino-methyl-phosphine oxide.

The N,N - diethylamidomethanephosphonic chloride employed as a starting material in the above-described process may be prepared by reacting one molecular proportion of diethylamine with at least two molecular proportions of methanephosphonic dichloride in an inert organic solvent such as diethyl ether. The reaction is carried out in the presence of a hydrogen chloride acceptor, which may conveniently be an excess of the amine reactant. The reaction takes place readily at temperatures of from 20° to 40° C. In carrying out the reaction, the diethylamine is added portionwise to the methanephosphonic dichloride dispersed in the solvent and the resulting mixture heated for a period of time to complete the reaction. The reaction is somewhat exothermic, temperature being controlled by regulation of the rate of contacting the reactants, as well as by the addition and subtraction of heat, if required. Upon completion of the reaction, the mixture may be filtered and the filtrate fractionally distilled under reduced pressure to separate the desired N,N-diethylamidomethanephosphonic chloride. The latter is an oily liquid having a boiling point of 135° C. at 27 millimeters pressure.

In a representative preparation, 7 grams (0.049 mole) of sodium ethylxanthate was added to 7.5 grams (0.044 mole) of N,N-diethylamidomethanephosphonic chloride dispersed in 50 milliliters of benzene and the resulting mixture heated for 2 hours at a temperature of 60° C. The mixture was then filtered and the filtrate concentrated by distillation under reduced pressure to a temperature up to 60° C. to obtain as a residue an ethylxanthoylthioxy - N,N - diethylamino-methyl-phosphine oxide product. The latter is a viscous oil having a density of 1.189 at 20° C.

The new ethylxanthoylthioxy - N,N - diethylamino-methyl-phosphone oxide product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

In representative operations against flies and cockroaches, 100 percent kills of these pests are obtained with dust compositions containing 4.5 percent by weight of the toxic phosphine oxide.

This is a continuation in part of my copending application Serial No. 203,763, filed December 30, 1950.

I claim:

Ethylxanthoylthioxy - N,N - diethylamino - methyl-phosphine oxide.

HENRY TOLKMITH.

No references cited.